Patented Oct. 5, 1948

2,450,525

UNITED STATES PATENT OFFICE 2,450,525

PREPARATION OF MACARONI PRODUCTS

René Samson, Montreal, Quebec, Canada

No Drawing. Application August 4, 1945,
Serial No. 609,015
In Canada July 13, 1943

1 Claim. (Cl. 99—85)

The present invention relates to a food product and, more particularly, an alimentary paste in the form of macaroni, spaghetti, vermicelli, noodles and the like.

It is well known that pastes of the character above constitute a food product which is not cooked during manufacture; generally speaking, a semolina of wheat is moistened with water, extruded into suitable shapes and simply air-dried.

The product is thereafter cooked in water, soups, broths, etc., in manners dictated by experience in the culinary art.

Said cooking, however, destroys crispness of the original product and, accordingly, many suggestions have been made to avoid this disadvantage. Said suggestions however, represent either an increase in the cost of the product or the loss of some desirable property.

The present invention has been conceived to avoid the drawbacks noted above and, consequently, its objects may be stated as follows:

The main object of the invention resides in the provision of means whereby an alimentary paste will result having improved qualities.

Another object contemplates such a paste adapted to cook more rapidly while retaining substantially all of its original taste and crispness.

A further object concerns a paste of the character described which is obtainable at relatively low cost and in a simple manner.

Other objects and advantages of the invention will become apparent as the description progresses.

Briefly stated, the invention consists in the addition, to semolina, of a colloid chosen among those of vegetable and animal origin. More particularly, the colloids added are in the form of a wetting solution, intended to replace the water used for moistening purposes, said solution including colloids chosen among pectin, algin, gelatine and flavoring agents such as sucrose, fructose, dextrose, etc. Normally, said substances produce solutions having a pH around 7.0, slightly above or below.

In accordance with the invention, the addition of a colloid, in calculated or predetermined percentages permits obtaining a finished product having definite cooking properties. In other words, the time of cooking can be adjusted by varying the colloid content of the paste within the limits specified below. In certain types of so-called "short" pastes, noodles and the like having a specified cooking time in minutes, this is an important feature.

In the manufacture of macaroni, for example, the semolina of durum or hard wheat, or flour of durum, hard or spring wheat, is thoroughly mixed with a certain quantity of the wetting aqueous solution of the type described above, whereby a paste is obtained that can be extruded conveniently into the proper shape and allowed to dry at a definite temperature.

To illustrate, one hundred pounds of semolina of durum or hard wheat or flour of durum, hard or spring wheat may require between 20 to 35 lbs. of this wetting aqueous solution of the type described above to make a proper mixture.

When using a concentrated master solution for the manufacturing of this new product, it is necessary always to measure an exact volume of this master solution, dilute it, in same proportions as the excess ingredients entering in the making of this master solution. This can be obtained in a practical way by using and measuring an already prepared solution of the type mentioned above. In other words, by using and measuring an already prepared solution, the quality of the finished product can be easily controlled and standardized.

This wetting aqueous solution should be prepared by dissolving pectin, algin or gelatine in dried form, and adding sucrose, fructose, dextrose, etc. in a quantity of water not exceeding the volume required for the batch of paste to be processed. The quantity of dry ingredients to be dissolved in water to make this aqueous solution may vary from 0.1% to as much as 5% of the weight of the flour or semolina used, depending on the quality of the product made as well as the cooking properties required.

In manufacturing an alimentary paste of the character described, the following method may also be used: semolina or flour of wheat is thoroughly wetted with an aqueous solution containing the solid ingredients above, in the proper proportion with respect to the weight of semolina, to which is added water to make up the difference of water required when the wetting aqueous solution is too concentrated, so as to form a pasty material which may readily be pressed into different shapes, the water then being caused to evaporate from said paste by following the well-known process generally employed in manufacturing alimentary pastes.

It will easily be understood that the addition of a colloidal aqueous solution of the type described above to the semolina or flour of wheat will result in an alimentary product of great nutritive qualities and better cooking properties, without interfering with the actual process followed in manufacturing same.

Having thus described my invention, I claim:

In a process for manufacturing macaroni, spaghetti and the like uncooked alimentary pastes, for the purpose of controlling the cooking time of said pastes, the step of adding to the semolina flour used in such manufacture an aqueous solution of a colloid from the group consisting of pectin, algin and gelatin, the percentage of solid colloid to the semolina flour being comprised between 1% to 5%.

RENÉ SAMSON.

REFERENCES CITED

The following references are of record in the file of this patent:

UNITED STATES PATENTS

| Number | Name | Date |
|---|---|---|
| 1,570,443 | McSorley | Jan. 19, 1926 |
| 1,733,574 | Block | Oct. 29, 1929 |
| 2,025,705 | Bienenstock | Dec. 31, 1935 |
| 2,037,042 | Perewe | Apr. 14, 1936 |
| 2,074,064 | Rash | Mar. 16, 1937 |

FOREIGN PATENTS

| Number | Country | Date |
|---|---|---|
| 16,531 | Great Britain | 1915 |
| 22,787 | Great Britain | 1909 |
| 110,660 | Australia | May 21, 1940 |
| 385,796 | Great Britain | 1932 |